United States Patent
Bonham et al.

(10) Patent No.: US 8,918,424 B2
(45) Date of Patent: Dec. 23, 2014

(54) MANAGING HOMEOWNER ASSOCIATION MESSAGES

(75) Inventors: Ryan Bonham, Lehi, UT (US); Esteban Araya, Lehi, UT (US)

(73) Assignee: Advanced Community Services, Lehi, UT (US)

( * ) Notice: Subject to any disclaimer, the term of this patent is extended or adjusted under 35 U.S.C. 154(b) by 531 days.

(21) Appl. No.: 13/285,997

(22) Filed: Oct. 31, 2011

(65) Prior Publication Data
US 2013/0110877 A1    May 2, 2013

(51) Int. Cl.
*G06F 17/30*    (2006.01)
*G06Q 10/10*    (2012.01)

(52) U.S. Cl.
CPC .................................. *G06Q 10/107* (2013.01)
USPC ............ 707/783; 707/665; 707/667; 707/782

(58) Field of Classification Search
CPC .................... G06F 17/30289; G06F 17/30864; G06F 17/30887
See application file for complete search history.

(56) References Cited

U.S. PATENT DOCUMENTS

| | | |
|---|---|---|
| 7,958,011 B1 | 6/2011 | Cretney et al. |
| 2006/0155594 A1 | 7/2006 | Almeida et al. |
| 2006/0162654 A1 | 7/2006 | Greenway |
| 2007/0027704 A1 | 2/2007 | Patel et al. |
| 2007/0112788 A1* | 5/2007 | Kobza et al. ................... 707/10 |
| 2008/0133385 A1* | 6/2008 | Lanter .............................. 705/30 |
| 2009/0012961 A1* | 1/2009 | Bramson et al. ................. 707/9 |
| 2009/0254572 A1* | 10/2009 | Redlich et al. .................. 707/10 |
| 2011/0202426 A1 | 8/2011 | Cretney et al. |
| 2012/0079368 A1* | 3/2012 | Abdelaziz et al. ............. 715/234 |
| 2012/0137360 A1* | 5/2012 | Henderson ..................... 726/17 |

\* cited by examiner

*Primary Examiner* — Mohammad S Rostami
(74) *Attorney, Agent, or Firm* — Kunzler Law Group

(57) ABSTRACT

For managing homeowner association messages, a communication module receives a message. A storage module stores the message. The communication module communicates the message to accounts through at least one of a plurality of communication channels in accordance with structured message restrictions. The structured message restrictions comprise full access, partial access, and no access restrictions. Each message comprises a message category of a plurality of message categories comprising a homeowner message, a confidential board member message, and a board member message. Each account is classified with an account class of a plurality of account classes. The account classes comprise a homeowner class, a board member class, and a property manager class. The structured message restrictions permit full access, partial access, or no access to the message for each account.

15 Claims, 7 Drawing Sheets

| | Title 810a | Message ID 815a | Creation Date 820a | Note ID 825a |
|---|---|---|---|---|
| 805a | | | | |
| 805b | Title 810b | Message ID 815b | Creation Date 820b | Note ID 825b |
| 805c | Title 810c | Message ID 815c | Creation Date 820c | Note ID 825c |

| Note ID 910a | Creation Date 915a | Dwelling ID 920a | Text 925a | Status 930a | Res Needed 935a | Close Date 940a |
| --- | --- | --- | --- | --- | --- | --- |
| Note ID 910b | Creation Date 915b | Dwelling ID 920b | Text 925b | Status 930b | Res Needed 935b | Close Date 940b |
| Note ID 910c | Creation Date 915c | Dwelling ID 920c | Text 925c | Status 930c | Res Needed 935c | Close Date 940c |

FIG. 9

MANAGING HOMEOWNER ASSOCIATION MESSAGES

FIELD

The subject matter disclosed herein relates to homeowner associations and more particularly relates to managing homeowner association messages.

BACKGROUND

Description of the Related Art

Homeowner associations have a number of stakeholders, including the home owners, property managers, board members, vendors, and office staff that must communicate to achieve their common objectives.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a schematic block diagram illustrating one embodiment of a Note table.

DETAILED DESCRIPTION OF THE INVENTION

Figure 1:
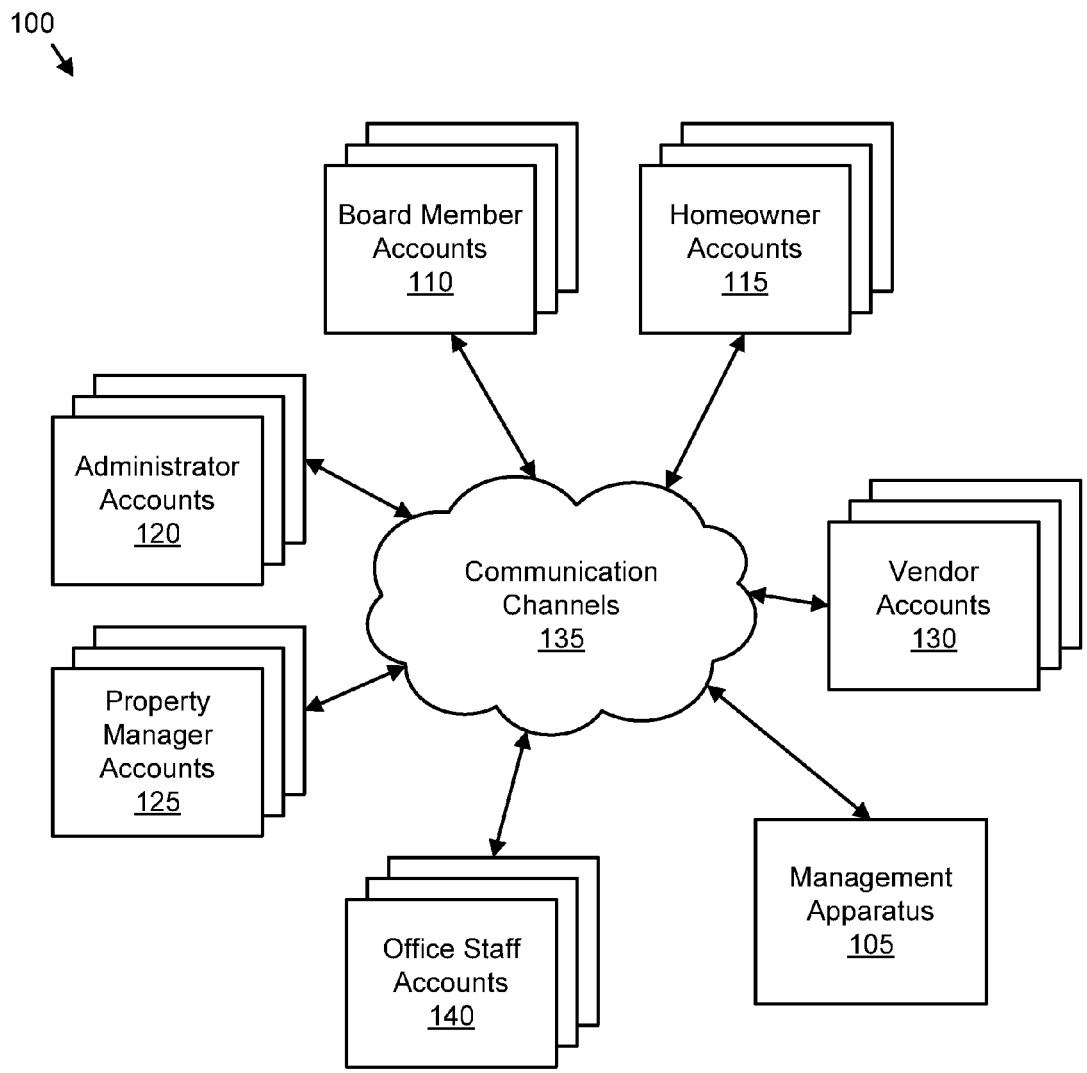
FIG. 1 is a schematic block diagram illustrating one embodiment of a homeowner association message system.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In another embodiment, the service provider requests payment directly from a customer account at a banking or financial institution. In one embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a homeowner association message system 100. The system 100 includes a management apparatus 105, board member accounts 110, homeowner accounts 115, administrator accounts 120, property manager accounts 125, vendor accounts 130, and office staff accounts 140. The board member accounts 110, homeowner accounts 115, administrator accounts 120, property manager accounts 125, vendor accounts 130, and office staff accounts 140 are examples of account classes. The account classes may identify the role of the user of each account within a homeowners association.

The management apparatus 105, board member accounts 110, homeowner accounts 115, administrator accounts 120, property manager accounts 125, vendor accounts 130, and office staff accounts 140 may communicate through communication channels 135. The communication channels 135 may comprise one or more of the Internet, a cellular telephone network, an instant messaging system, a wide area network, a local area network, or the like. The communication channels 135 may transmit messages. The messages may be organized as digital data packets, analog signals, or the like The management apparatus 105, board member accounts 110, homeowner accounts 115, administrator accounts 120, property manager accounts 125, vendor accounts 130, and office staff accounts 140 may communicate the messages through the communication channels 135. A first message may be sent through one or more communication channels 135. For example, the management apparatus 105 may communicate the first message through a cellular telephone network to a board member account 110 and communicate the first message through the Internet to a property manager account 125.

The messages may comprise email messages, Short Message Service (SMS), messages, telephonic messages, text messages, mobile phone application data, and custom data structures. The messages may comprise task descriptions for tasks to be performed by the users of one or more accounts. Alternatively, the messages may comprise requests, notices, notifications, announcements, bills, work orders, invoices, and the like.

An administrator may have access to the management apparatus 105. The board member accounts 110, homeowner accounts 115, administrator accounts 120, property manager accounts 125, vendor accounts 130, and office staff accounts 140 may be created by the administrator. In one embodiment, accounts are created when a relationship is formed between an account and one or more homeowner associations. Each account may include a preexisting email address, telephone number, Universal Resource Locators (URL), SMS accounts, and the like through which an account user may be contacted. Alternatively, each account may access a messaging system hosted by the management apparatus 105.

In one embodiment, the board member accounts 110, homeowner accounts 115, administrator accounts 120, property manager accounts 125, vendor accounts 130, and office staff accounts 140 may direct messages to the email addresses telephone numbers, URLs, SMS accounts, and the like. Alternatively, the board member accounts 110, homeowner accounts 115, administrator accounts 120, property manager accounts 125, vendor accounts 130, and office staff accounts 140 may be accessed by logging in to the management apparatus 105.

In addition, each user of the board member accounts 110, homeowner accounts 115, administrator accounts 120, property manager accounts 125, vendor accounts 130, and/or office staff accounts 140 may designate preferences for sending and receiving messages. For example, a first board member account 110 may specify that messages are to be first sent through email and then sent through a cellular telephone network if email was unsuccessful.

The homeowners association may include many stakeholders, each with one or more roles within the homeowners association. For example, a user may be a homeowner of a dwelling within the homeowners association. In addition, the same user may also be a board member of the homeowners association and be responsible for the governance of the homeowners association. An administrator may oversee the functions of a plurality of homeowners associations. Office staff may be responsible for performing administrative and/or maintenance functions for one or more homeowners associations. Vendors may be responsible for performing repairs, maintenance, and the like for common areas of the homeowners association and/or for individual dwellings.

The people in these roles may communicate the messages to manage the homeowners association. The messages may reference a note. The note may include information on a task, requests, notices, notifications, announcements, bills, work orders, invoices, and the like. In addition, the note may reference one or more attached documents. In one embodiment, a plurality of related messages may reference one or more notes.

For example, a homeowner may send a message referencing a first note from a homeowner account to one or more board member accounts. A member of the board may respond with another message that also references the first note. In addition, the note may be added to with each communication.

Some messages and/or notes may include confidential and/or proprietary information. Many of the stakeholders within the homeowners association should not be privy to specified messages because of the messages contain confidential information. However, it may be vital that other stakeholders are appraised of the specified messages. The embodiments described herein manage access to messages communicated between the various accounts based on the role of each account within the homeowners association. By efficiently managing access to messages, the embodiments assure that necessary information is available where needed, reduce the receipt of irrelevant information, and protect confidential and proprietary information. As a result, the management of the homeowners association is more efficient and profitable.

Figure 2:
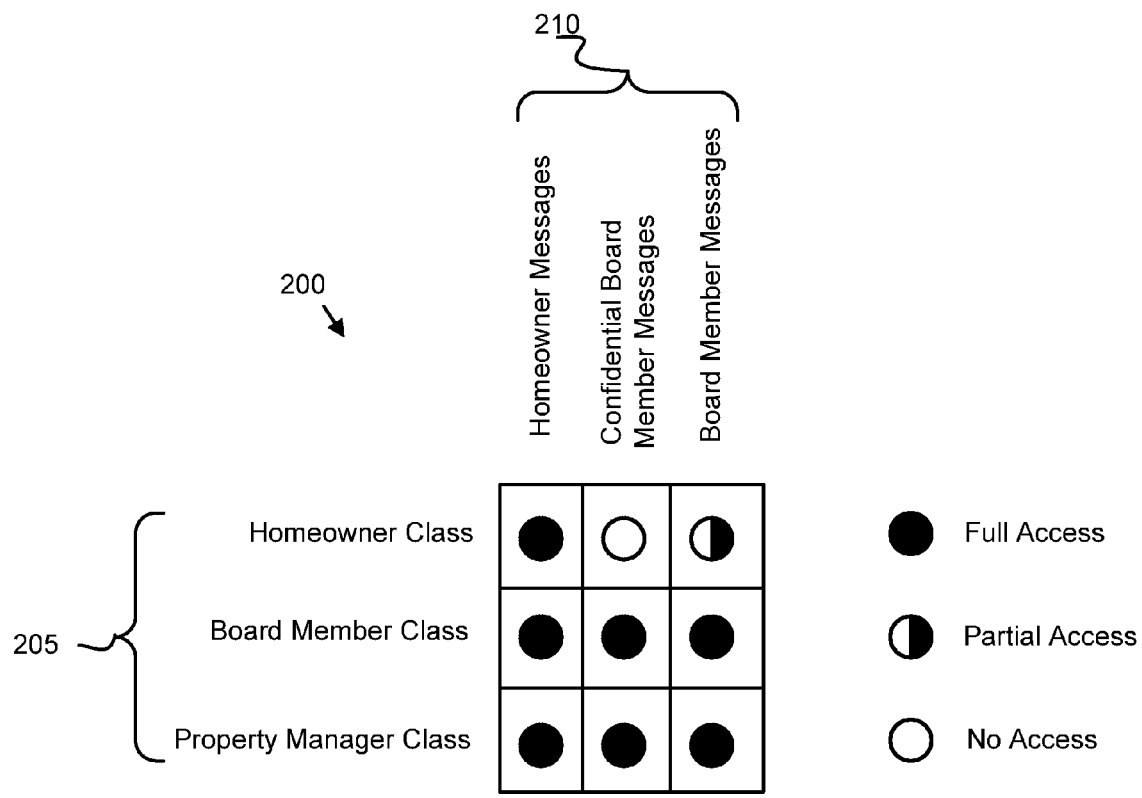
FIG. 2 is a table illustrating one embodiment of message access by account class for message categories.

FIG. 2 is a table 200 illustrating one embodiment of message access by account class 205 for message categories 210. The account classes 205 are the classes of the accounts of FIG. 1. The message categories 210 categorize messages sent between the accounts of FIG. 1. The description of the account classes 205 and the message categories 210 refer to elements of FIG. 1, like numbers referring to like elements.

The account classes 205 include a homeowner class comprising the homeowner accounts 115, a board member class comprising the board member accounts 110, and a property manager class comprising the property manager accounts 125. Because a homeowners association board member may also be a homeowner, in one embodiment, a board member may have a board member account 110 and a separate homeowner account 115. Alternatively, the board member may have a single board member account 110 that also functions as a homeowner account 115.

The message categories 210 include a homeowner message, a confidential board member message, and a board member message. One of skill in the art will recognize that the embodiments may be practiced with additional account classes 205 and message categories 210.

In one embodiment, a homeowner message is created by a homeowner account 115. For example, a first homeowner account 115 may create a first homeowner message regarding a roof repair. Alternatively, the homeowner message may be a message that is last added to by the homeowner account 115. For example, a first board member account 110 may create a first board member message. The first homeowner account 115 may respond to the first board member message, creating a homeowner message.

In one embodiment, the confidential board member message is a message that is created by and/or last added to by a first board member account 110. In one embodiment, the confidential board member message is further flagged as confidential. In one embodiment, the originator first board member account 110 flags the confidential board member message as confidential. Alternatively, a subsequent recipient of the confidential board member message may flag the confidential board member message as confidential.

The board member message is the message that is created by and/or last added to by the first board member account 110. The communication of messages between accounts of the account class 205 is regulated by structured message restrictions. The structured message restrictions comprise a full access restriction, a partial access restriction, and a no access restriction. In one embodiment, the full access restriction communicates all messages of a specified message category 210 to the accounts of the specified account class 205.

In one embodiment, the partial access restriction permits access by a first account to a first message only if the first account is explicitly listed as a recipient of the first message. For example, a first homeowner account 115 may receive a first board member message if the first homeowner account 115 is explicitly listed as a recipient of the first board member message.

In an alternate embodiment, the partial access restriction permits access to the first message by the first account if a visible flag for the first message is set for the first account. For example, the first homeowner account 115 may receive the first board member message if the visible flag for the first message is set for the first homeowner account 115.

In one embodiment, an identifier of each homeowner account 115 related to a first message is included with the first message. For example, the first board member message may be regarding the construction of a storage unit by the first homeowner account 115. However, the first homeowner account 115 may only be given access to the first message if a visible to homeowner flag is set for the first message. Setting the visible to homeowner flag may allow the first homeowner account 115 to access the first message. Otherwise, the first homeowner account 115 may not access the first message although the identifier of the first homeowner account 115 is included with the message. This provides extra protection to assure that confidential information is not accidentally sent to a homeowner.

The no access restriction may prevent all access by an account class 205 to the specified message category 210. For example, accounts of the homeowner class may be restricted from all access to messages of the confidential board member message class.

In the depicted embodiment, the structured message restrictions permit full access to homeowner messages for the homeowner class, the board member class and the property manager class. In addition, the structured message restrictions may permit full access to confidential board member messages for the board member class and the property manager class. The structured message restrictions may permit no access to confidential board member messages for the homeowner class.

The structured message restrictions may permit full access to board member messages for the board member class and the property manager class. In addition, the structured message restrictions may permit partial access to the board member messages for the homeowner class.

Figure 3:
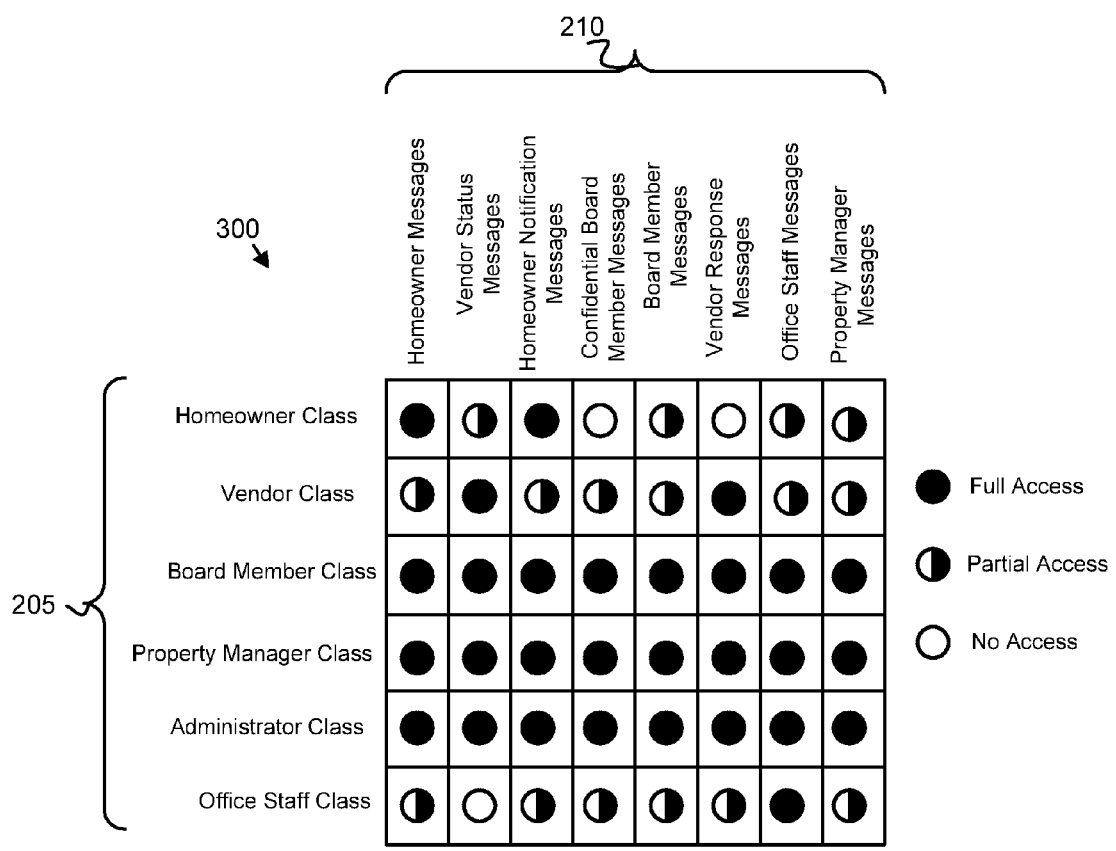
FIG. 3 is a table illustrating one alternate embodiment of message access by account class for message categories.

FIG. 3 is a table 300 illustrating one alternate embodiment of message access by account class 205 for the message categories 210. The account classes 205 include the classes of the accounts of FIGS. 1-2. The message categories 210 categorize messages sent between the accounts of FIG. 1. The description of the account classes 205 and the message categories 210 refer to elements of FIGS. 1-2, like numbers referring to like elements.

In the depicted embodiment, the account class 205 further includes a vendor class, an administrator class, and an office staff class. The vendor class comprises the vendor accounts 130. The administrator class comprises the administrator accounts 120. The office staff class comprises the office staff accounts 140.

In some embodiments, the message categories 210 include a vendor status message, a homeowner notification message, a vendor response message, an office staff message, and a property manager message. A vendor status message is the message that is created by and/or last added to by a first vendor account 130. The vendor status message may convey information regarding to a task performed by a vendor.

The homeowner notification message is the message that is created by and/or last added to by an account one of the vendor class, the board member class, the property manager class, the administrator class and/or the office staff class. In one embodiment, the homeowner notification message is a general announcement directed to all homeowners. The homeowner notification message may have a logical flag that when set identifies the homeowner notification message.

The vendor response message may be a response to a message directed to the first vendor. In one embodiment, the vendor response message is created by and/or last added to by an account of the vendor class. The office staff message may be a message that is created by and/or last added to by an account of the office staff class. In addition, the property manager message may be a message that is created by and/or last added to by an account of the property manager class.

In one embodiment, and the structured message restrictions permit full access to homeowner messages for the administrator class. In addition, the structured message restrictions may permit partial access to the homeowner messages for the vendor class and office staff class.

The structured message restrictions may permit full access to confidential board member messages for the administrator class. Further, the structured message restrictions may permit partial access to the confidential board member messages for the vendor class and the office staff class. In addition, the structured message restrictions permit full access to board member messages for the administrator class, and permit partial access to the board member messages for the vendor class and the office staff class.

In one embodiment, the structured message restrictions permit full access to vendor status messages for the vendor class, the board member class, the property manager class, and the administrator class. In addition, the structured message restrictions may permit partial access to the vendor status messages to the homeowner class, and the structure message restrictions permit no access to the vendor status messages to the office staff class.

In one embodiment, the structured message restrictions permit full access to homeowner notification messages for the homeowner class, the board member class, the property manager class, and the administrator class. In addition, the structured message restrictions may permit partial access to the homeowner notification messages for the vendor class and the office staff class.

In one embodiment, the structured message restrictions permit full access to vendor response messages for the vendor class, the board member class, the property manager class, and the administrator class. The structured message restrictions may further permit partial access to the vendor response messages for the office staff class. In addition, the structured message restrictions may permit no access to vendor response messages for the homeowner class.

In one embodiment, the structured message restrictions permit full access to office staff messages for the board member class, the property manager class, the administrator class, and the office staff class. In addition, the structured message restrictions may permit partial access to the office staff messages for the homeowner class and the vendor class.

Figure 4:
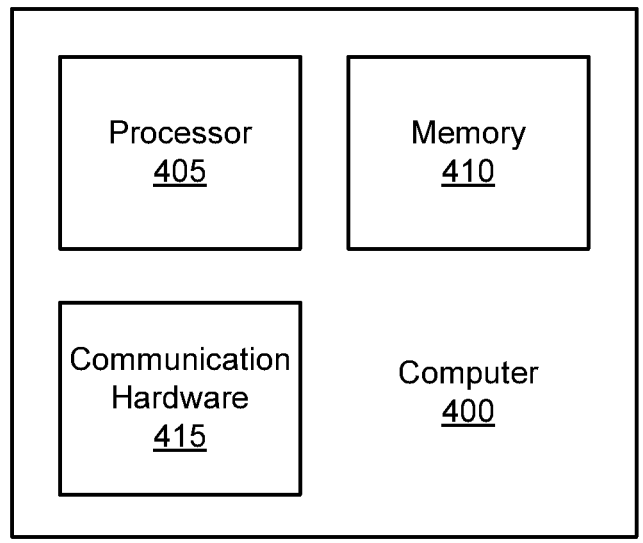
FIG. 4 is a schematic block diagram illustrating one embodiment of a computer.

In one embodiment, the structured message restrictions permit full access to property manager messages for the board member class, the property manager class, and the administrator class. In addition, the structured message restrictions may permit partial access to property manager messages for the homeowner class, the vendor class and the office staff class FIG. 4 is a schematic block diagram illustrating one embodiment of a computer 400. The computer 400 may comprise the management apparatus 105 of FIG. 1. The description of the computer 400 may refer to elements of FIGS. 1-3, like numbers referring to like elements. The computer 400 includes a processor 405, a memory 410, and communication hardware 415.

The memory 410 may store computer readable program code. The memory 410 may be a nonvolatile storage device such as a hard disk drive. Alternatively, the memory 410 may be a volatile storage device such as a Dynamic Random Access Memory (DRAM). The processor 405 may execute the computer readable program code stored on the memory 410. The communication hardware 415 may communicate data and commands with external devices such as the communication channels 135.

Figure 5:
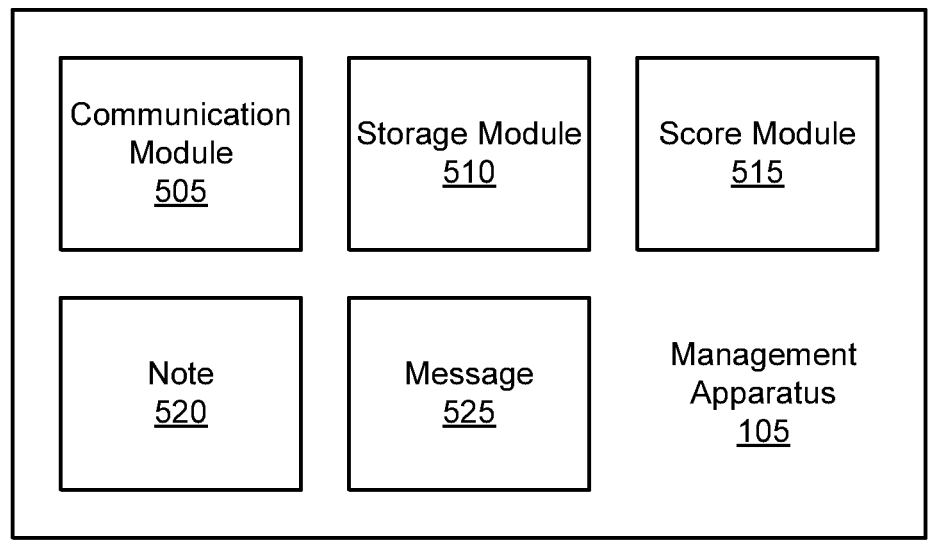
FIG. 5 is a schematic block diagram illustrating one embodiment of a management apparatus.

FIG. 5 is a schematic block diagram illustrating one embodiment of the management apparatus 105. The management apparatus 105 may be the management apparatus of FIG. 1 and may be embodied by the computer 400 of FIG. 4. In a certain embodiment, the management apparatus 105 is embodied in a plurality of computers 400, networks, and/or discrete devices. The description of the management apparatus 105 refers to elements of FIGS. 1-4, like numbers referring to like elements. The management apparatus 105 includes a communication module 505, a storage module 510, a score module 515, a note 520, and a message 525.

In one embodiment, the communication module 505, storage module 510, score module 515, note 520, and message 525 are configured as computer readable program code stored on the memory 410 and executed by the processor 405.

The communication module 505 may receive the message 525 from an account. For example, the communication module 505 may receive a first property manager message from an account in the property manager class. The message 525 may reference the note 520. In one embodiment, a plurality of messages 525 reference a single note 520.

The communication module 505 may receive the message 525 as an email from a first account, as SMS message from the first account, as a post to a URL by the first account, or the like. The storage module 510 may store the message 525. In one embodiment, the message 525 is stored in the memory 410 as part of a message table. The note 520 may also be stored in the memory 410 as part of a node table.

The communication module 505 may further communicate the message 525 to one or more accounts. The communication module 505 may communicate the message 525 subject to the restrictions of the structured message restrictions 735.

The message 525 may also include one of the message categories 210. In addition, the message 525 may include one of the account classes 205. In one embodiment, the creator of the message 525 inputs the message category 210 for the message 525. Alternatively, the communication module 505 may determine the message category 210 for the message 525. For example, the communication module 505 may determine the message category 210 based on the account class 205 of the account that creates the message 525 and the account class 205 of the destination account. Alternatively, the communication module 505 may determine the message category 210 for the message 525 based on the account class 205 of the account last adding to the message 525 and the destination account. The score module 515 may calculate a score for a note as will be described hereafter.

Figure 6:
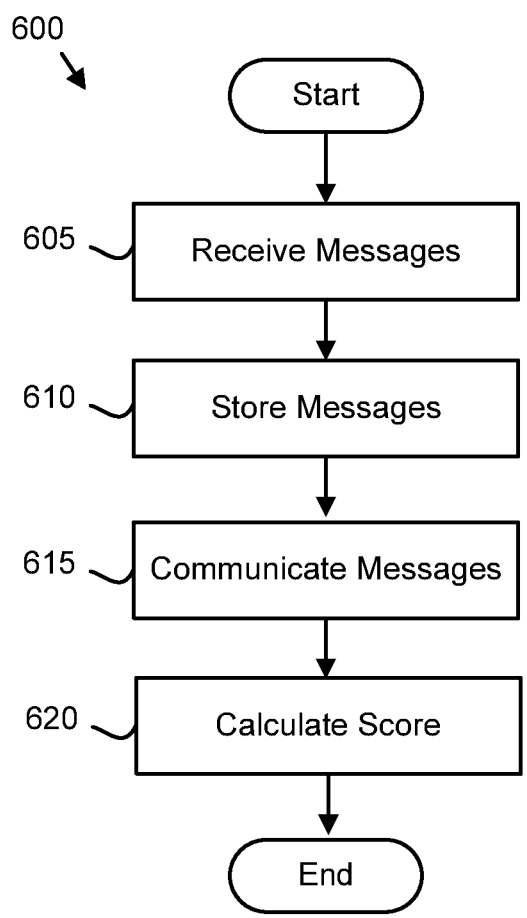
FIG. 6 is a schematic flow chart diagram illustrating one embodiment of a method for managing homeowner association messages.

FIG. 6 is a schematic flow chart diagram illustrating one embodiment of a method 600 for managing homeowner association messages 525. The description of the method 600 refers to elements of FIGS. 1-5, like numbers referring to like elements. The functions of the method 600 may be performed by the computer readable program code stored in the memory 410 and executed by the processor 405.

The method 600 begins, and in one embodiment, the communication module 505 receives 605 the message 525. The message 525 may be communicated to the communication module 505 through the communication channels 135. In one embodiment, the communication module 505 determines a first account sending the message 525 from a source address of the message 525.

The storage module 510 stores 610 the message 525. In one embodiment, the storage module 510 stores 610 the message 525 in a message table of a database.

The communication module 505 further communicates 615 the message 525 to one or more destination accounts subject to the restrictions of the structured message restrictions 735. In one embodiment, the communication module 505 receives a list of the destination accounts with the message 525. Alternatively, the communication module 505 may create a list of the destination accounts from a destination label. For example, a homeowner label may specify that the message 525 be sent to all homeowners. The communication module 505 may further retrieve addresses for each of the destination accounts, and communicate 615 a message 525 to each of the addresses.

In one embodiment, the communication module 505 communicates the message 525 by permitting accounts that are originators and/or recipients of the message 525 to access the message 525 at a later date. For example, a board member account 110 may search for all messages related to a specified homeowner. If the board member account 110 was an originator or recipient of the message 525, the board member account 110 may access the message 525.

In one embodiment, the score module 515 calculates 620 a score for a note 520 and the method 600 ends. The score module 515 may calculate 620 the score when the status of the note 520 is a closed status. In one embodiment, each note 520 comprises a closed date and a resolution needed date. The resolution needed date may be established when a task or other action is created. The score module 515 may calculate a note response score s using Equation 1, where w is a weight, t1 is the closed date, and t2 is the resolution needed date for the note 520

$$s = w(t1 - t2) \qquad \text{Equation 1}$$

In one embodiment, the score module 515 calculates 620 a score s for an account class such as all board members or a specified account using Equation 2, where t1 is the closed date and t2 is the resolution needed date for each of a plurality of notes 520 related to the class or the specified account.

$$s = \Sigma w(t1 - t2) \qquad \text{Equation 2}$$

Figures 7, 8:
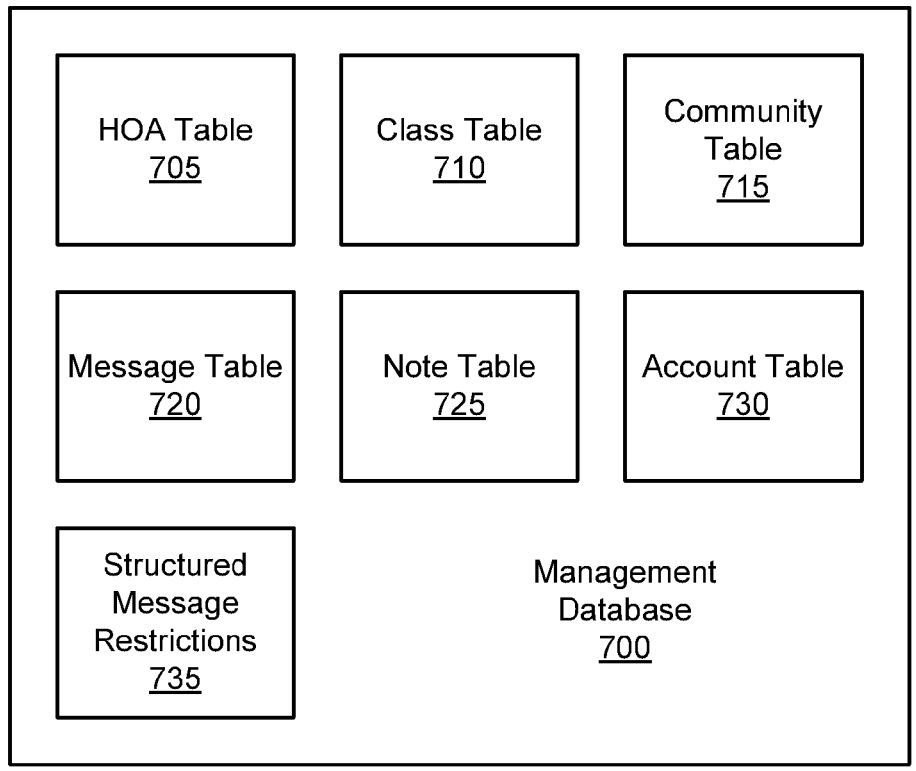
FIG. 7 is a schematic block diagram illustrating one embodiment of a management database.
FIG. 8 is a schematic block diagram illustrating one embodiment of a message table.

FIG. 7 is a schematic block diagram illustrating one embodiment of a management database 600. The management database 600 may be stored in the memory 410 of the computer 400 of FIG. 4. The description of the management database 600 refers to elements of FIGS. 1-6, like numbers referring to like elements. The management database 600 includes a homeowners association (HOA) table 705, a class table 710, a community table 715, a message table 720, a note table 725, an account table 730, and the structured message restrictions 735.

The management database 600 may support the management of a plurality of homeowners associations. The stakeholders of each homeowners association may access the management database 710 and the management apparatus 105 to conduct business for their respective homeowners associations.

In one embodiment, the homeowners association table 705 comprises entries for the plurality of homeowners associations. Each entry in the homeowners association table 705 may include an identifier for a homeowners association. In a certain embodiment, each entry in the homeowners association table 705 may also identify an administrator for the homeowners association. In one embodiment, only the administrator for a first homeowners association may make administrative changes to the management database 700 for the first homeowners association.

The class table 710 may list the account class 205 for each account of the account table 730. In one embodiment, the class table 710 associates an identifier of each account with an account class 205.

The community table 715 may list each dwelling that is part of the homeowners associations listed in the homeowner association tables 705. In one embodiment, each entry of the community table 715 includes an identifier that may be associated with an account. In addition, each community table entry may include an address and or legal description of the dwelling.

The message table 720 may store each message 525 communicated to and from the management apparatus 105. The organization of each entry in the message table 720 will be described in detail hereafter.

The note table 725 may store notes 520 attached to each message 525. In one embodiment, a note 520 comprises a task, a request, a notice, a notification, an announcement, a bill, a work order, an invoice, and the like. Each note 520 may be attached to a plurality of messages 525.

The account table 730 may store each account. In one embodiment, each account table entry includes an account identifier, one or more communication addresses for the account, an account class 205, and a community table identifier for a dwelling.

The structured message restrictions 735 may be organized as a table associating each account class 205 and message category 210 with a restriction. In one embodiment, the structured message restrictions 735 associate a restriction with each account class/message category pair. In a certain embodiment, the structured message restrictions 735 are organized as a table similar to the tables 200, 300 of FIGS. 2-3. Alternatively, the structured message restrictions 735 are organized as logical rules.

FIG. 8 is a schematic block diagram illustrating one embodiment of a message table 720. The message table 720 is the message table of FIG. 7. The description of the message table 720 refers to elements of FIGS. 1-7, like numbers referring to like elements.

The message table 720 comprises a plurality of entries 805. Each entry includes a title 810, a message identifier 815, a creation date 820, and a note identifier 825. Each message 525 may have a separate entry 805 in the message table 720. The title 810 may label the message 525. The message identifier 815 may identify the message 525 within the management database 700. The creation date 820 may be a time stamp of when the message 525 is created. The note identifier 825 associates a note 520 from the note table 725 with the entry 805 for the message 525.

FIG. 9 is a schematic block diagram illustrating one embodiment of a note table 725. The note table 725 is that note table 725 of FIG. 7. The description of the note table 725 refers to elements of FIGS. 1-8, like numbers referring to like elements.

Each note 520 of the note table 725 includes an entry 905. Each entry 905 includes a note identifier 910, a creation date 915, a dwelling identifier 920, text 925, a status 930, a resolution needed date 935, and a closed date 940. The note identifier 910 may identify the note 520 within the management database 700. The creation date 915 may be a time stamp of when the note 520 is created. The dwelling identifier 920 may identify the dwelling associated with the note 520. Through the dwelling identifier 920, the note 520 can also be associated with each homeowner account for the dwelling.

The text 925 may include a description of a task, a request, a notice, a notification, an announcement, a bill, a work order, an invoice, and the like. In one embodiment, the text 925 further includes one or more attached documents.

The status 930 may comprise one of the group consisting of a closed status, a response from board status, a board action status, a maintenance status, and an office status. The close status may indicate that the matter of the note is complete and that no further action is required. The response from board status may indicate that the homeowners association board must reach a decision on the matter and respond. A maintenance status may indicate that maintenance is required for a common area or a dwelling. The office status may indicate that one or more administrative functions are required.

The resolution needed date 935 may specify when the issues described by the note 520 are required to be resolved. The resolution date 935 may be a date, time, or combinations thereof. The closed date 940 may be a time stamp when the status of the note 520 is changed to the closed status.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing homeowner association messages comprising:

receiving, by use of a processor, a message, wherein each message comprises a title, a unique message identifier, a message creation date, and a note, and each note comprises a closed date and a resolution needed date;

storing the message;

communicating the message to accounts through at least one of a plurality of communication channels in accordance with structured message restrictions comprising full access, partial access, and no access restrictions, wherein the partial access restriction permits access to a first message by a first account only if a visible flag for the first message is set for the first account and the message comprises a message category of a plurality of message categories comprising a homeowner message, a confidential board member message, and a board member message, each account is classified with an account class of a plurality of account classes, the account classes comprising a homeowner class, a board member class, and a property manager class, and the structured message restrictions permit full access to homeowner messages for the homeowner class, the board member class and the property manager class, the structured message restrictions permit full access to confidential board member messages for the board member class and the property manager class, and the structured message restrictions permit no access to confidential board member messages for the homeowner class, the structured message restrictions permit full access to board member messages for the board member class, and the property manager class, and the structured message restrictions permit partial access to the board member messages for the homeowner class; and calculating a note response score s as $s=\Sigma w(t1-t2)$ where w is a weight, t1 is the closed date, and t2 is the resolution needed date for each note.

2. The method of claim 1, wherein the account classes further comprise a vendor class, an administrator class, and an office staff class and the structured message restrictions further permit full access to homeowner messages for the administrator class, the structured message restrictions permit partial access to the homeowner messages for the vendor class and office staff class, the structured message restrictions further permit full access to confidential board member messages for the administrator class, the structured message restrictions permit partial access to the confidential board member messages for the vendor class and the office staff class, the structured message restrictions permit full access to board member messages for the administrator class, and the structured message restrictions permit partial access to the board member messages for the vendor class and the office staff class.

3. The method of claim 2, the message categories further comprising a vendor status message, wherein the structured message restrictions permit full access to vendor status messages for the vendor class, the board member class, the property manager class, and the administrator class, the structured message restrictions further permit partial access to the vendor status messages to the homeowner class, and the structure message restrictions permit no access to the vendor status messages to the office staff class.

4. The method of claim 2, the message categories further comprising a homeowner notification message, wherein the structured message restrictions permit full access to homeowner notification messages for the homeowner class, the board member class, the property manager class, and the administrator class and the structured message restrictions permit partial access to the homeowner notification messages for the vendor class and the office staff class.

5. The method of claim 2, the message categories further comprising a vendor response message, wherein the structured message restrictions permit full access to vendor response messages for the vendor class, the board member class, the property manager class, and the administrator class, the structured message restrictions permit partial access to the vendor response messages for the office staff class, and the structured message restrictions permit no access to vendor response messages for the homeowner class.

6. The method of claim 2, the message categories further comprising an office staff message, wherein the structured message restrictions permit full access to office staff messages for the board member class, the property manager class, the administrator class, and the office staff class, and the structured message restrictions permit partial access to the office staff messages for the homeowner class and the vendor class.

7. The method of claim 2, the message categories further comprising a property manager message, wherein the structured message restrictions permit full access to property manager messages for the board member class, the property manager class, and the administrator class, and the structured message restrictions permit partial access to property manager messages for the homeowner class, the vendor class and the office staff class.

8. The method of claim 1, wherein the partial access restriction further permits access to a first message by a first account only if the first account is explicitly listed as part of the first message.

9. The method of claim 1, wherein a first homeowner account is given access to a first message if a visible to homeowner flag is set for the first message.

10. The method of claim 1, wherein the status comprises a closed status, a response from board status, a board action status, a maintenance status, and an office status.

11. The method of claim 1, wherein the plurality of communication channels comprise email messages, Short Message Service (SMS), messages, telephonic messages, text messages, mobile phone application messages, and custom data structures.

12. The method of claim 1, wherein the message is communicated by permitting accounts that are originators and recipients of the message to access the stored message.

13. The method of claim 12, wherein stored message is displayed in response to a search and selected from at least one displayed messages.

14. A computer program product for managing homeowner association messages, the computer program product comprising:
a non-transitory computer readable storage medium having computer readable program code embodied therein, the computer readable program code configured to:
receive a message, wherein each message comprises a title, a unique message identifier, a message creation date, and a note, and each note comprises a closed date and a resolution needed date;
store the message; and
communicate the message to accounts through at least one of a plurality of communication channels in accordance with structured message restrictions comprising full access, partial access, and no access restrictions, wherein the partial access restriction permits access to a first message by a first account only if a visible flag for the first message is set for the first account and the message comprises a message category of a plurality of message categories comprising a homeowner message, a confidential board member message, and a board member message, each account is classified with an account class of a plurality of account classes, the account classes comprising a homeowner class, a board member class, and a property manager class, and the structured message restrictions permit full access to homeowner messages for the homeowner class, the board member class and the property manager class, the structured message restrictions permit full access to confidential board member messages for the board member class and the property manager class, and the structured message restrictions permit no access to confidential board member messages for the homeowner class, the structured message restrictions permit full access to board member messages for the board member class, and the property manager class, and the structured message restrictions permit partial access to the board member messages for the homeowner class; and
calculating a note response score s as $s=\Sigma w(t1-t2)$ where w is a weight, t1 is the closed date, and t2 is the resolution needed date for each note.

15. An apparatus comprising:
a non-transitory computer readable storage medium storing computer readable program code executable by a processor, the computer readable program code comprising:
a communication module receiving a message, wherein each message comprises a title, a unique message identifier, a message creation date, and a note, and each note comprises a closed date and a resolution needed date;
a storage module storing the message; and
the communication module communicating the message to accounts through at least one of a plurality of communication channels in accordance with structured message restrictions comprising full access, partial access, and no access restrictions, wherein the partial access restriction permits access to a first message by a first account only if a visible flag for the first message is set for the first account and the message comprises a message category of a plurality of message categories comprising a homeowner message, a confidential board member message, and a board member message, each account is classified with an account class of a plurality of account classes, the account classes comprising a homeowner class, a board member class, and a property manager class, and the structured message restrictions permit full access to homeowner messages for the homeowner class, the board member class and the property manager class, the structured message restrictions permit full access to confidential board member messages for the board member class and the property manager class, and the structured message restrictions permit no access to confidential board member messages for the homeowner class, the structured message restrictions permit full access to board member messages for the board member class, and the property manager class, and the structured message restrictions permit partial access to the board member messages for the homeowner class; and calculating a note response score s as $s=\Sigma w(t1-t2)$ where w is a weight, t1 is the closed date, and t2 is the resolution needed date for each note.

* * * * *